Feb. 12, 1935.

C. FLAMINI 1,991,202

MEANS FOR STARTING, STOPPING, AND SPEED CHANGING IN MOTOR CARS AND THE LIKE

Filed June 28, 1932

INVENTOR.
Cesar Flamini.
BY
his ATTORNEY.

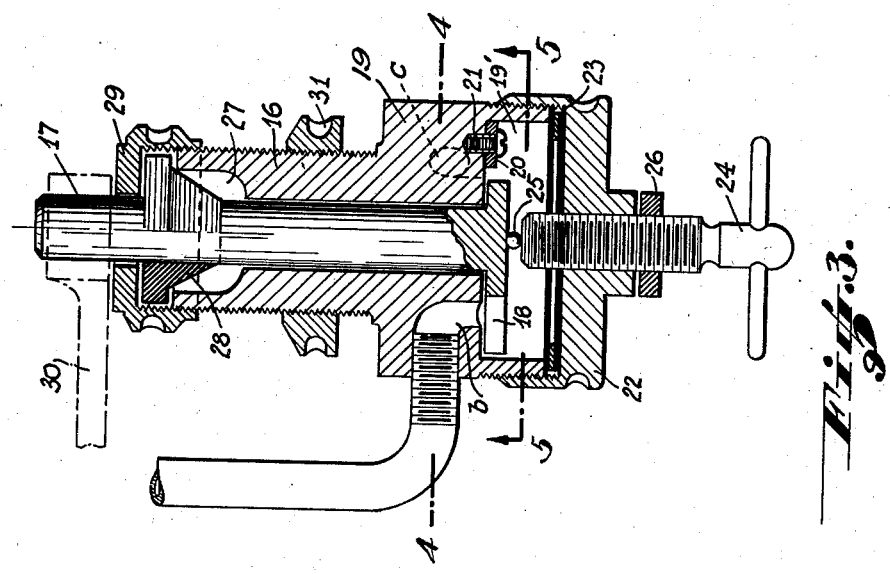
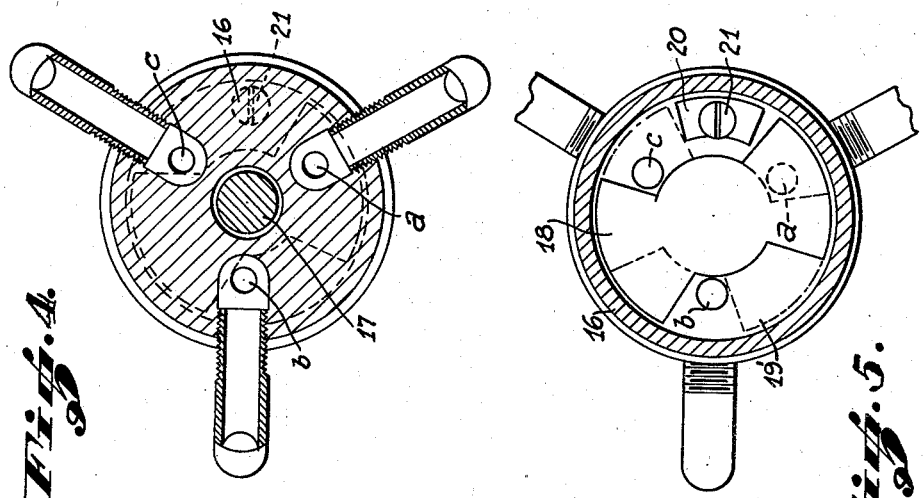
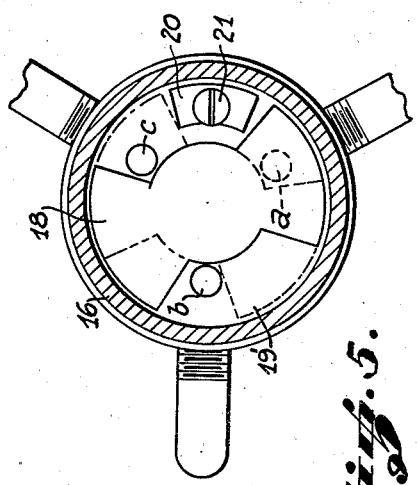
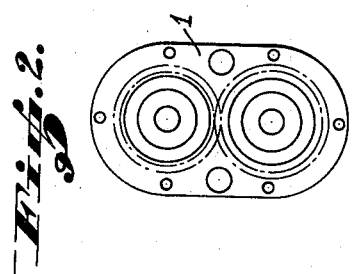

Feb. 12, 1935.   C. FLAMINI   1,991,202
MEANS FOR STARTING, STOPPING, AND SPEED
CHANGING IN MOTOR CARS AND THE LIKE
Filed June 28, 1932   3 Sheets-Sheet 3
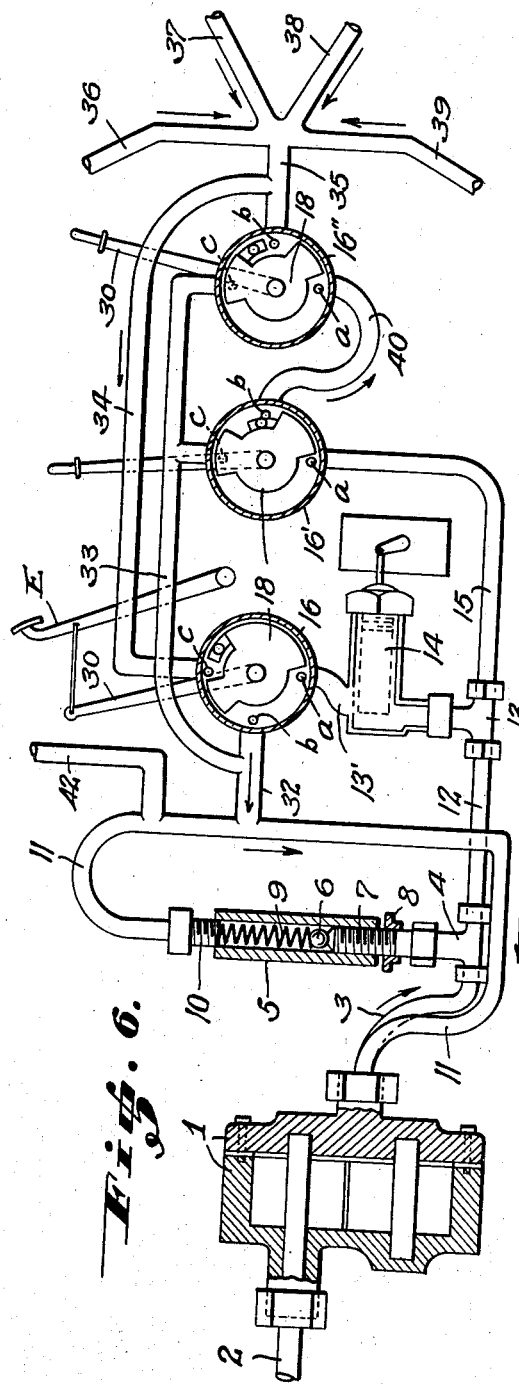
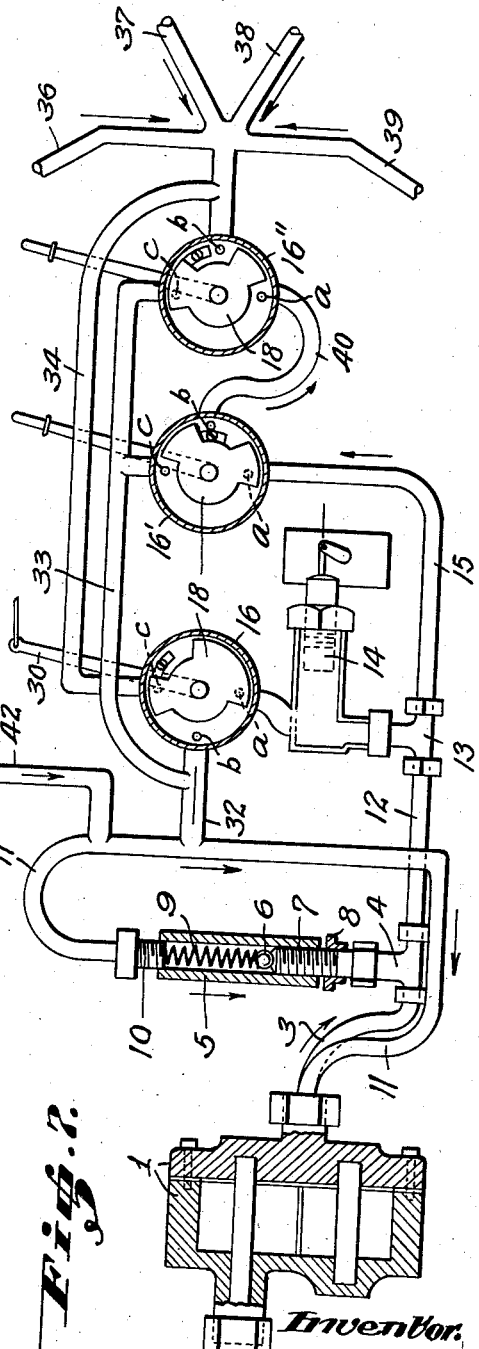
Inventor:
Cesar Flamini Patented Feb. 12, 1935

1,991,202

UNITED STATES PATENT OFFICE 1,991,202

MEANS FOR STARTING, STOPPING, AND SPEED CHANGING IN MOTOR CARS AND THE LIKE

Cesar Flamini, Buenos Aires, Argentina

Application June 28, 1932, Serial No. 619,686

5 Claims. (Cl. 192—.01)

This invention relates to motor propelled vehicles of the type in which a variable speed transmission gear is included in the driving connection between the motor and the wheels of the vehicle; in which a clutch is interposed in said driving connection between the motor and the transmission gear; in which normally released brakes are constructed to be applied by liquid under pressure, and in which an accelerator member is movable to control the speed of the motor, and the general object of the invention is to provide novel means whereby the control of such vehicles is greatly simplified.

With the foregoing general object in view the invention consists in the novel features of construction, combination and arrangement of parts as will be hereinafter more fully described, illustrated in the accompanying drawings and defined in the appended claims.

In the drawings:—

Figure 2 is an end view of the pump element of the mechanism.

Figure 3 is a longitudinal section through one of the control valves of the mechanism.

Figure 4 is a cross section on the line 4—4 of Fig. 3.

Figure 5 is a cross section on the line 5—5 of Fig. 3.

Figure 6 is a view similar to Figure 1 illustrating the cooperative relationship of the elements of the mechanism when the engine is running and the vehicle is in motion; and, Figure 7 is a view similar to Figures 1 and 6 illustrating the relationship of the elements of the mechanism when the vehicle is in motion with the accelerator element released, the clutch disengaged and the brakes released.

Figure 1:
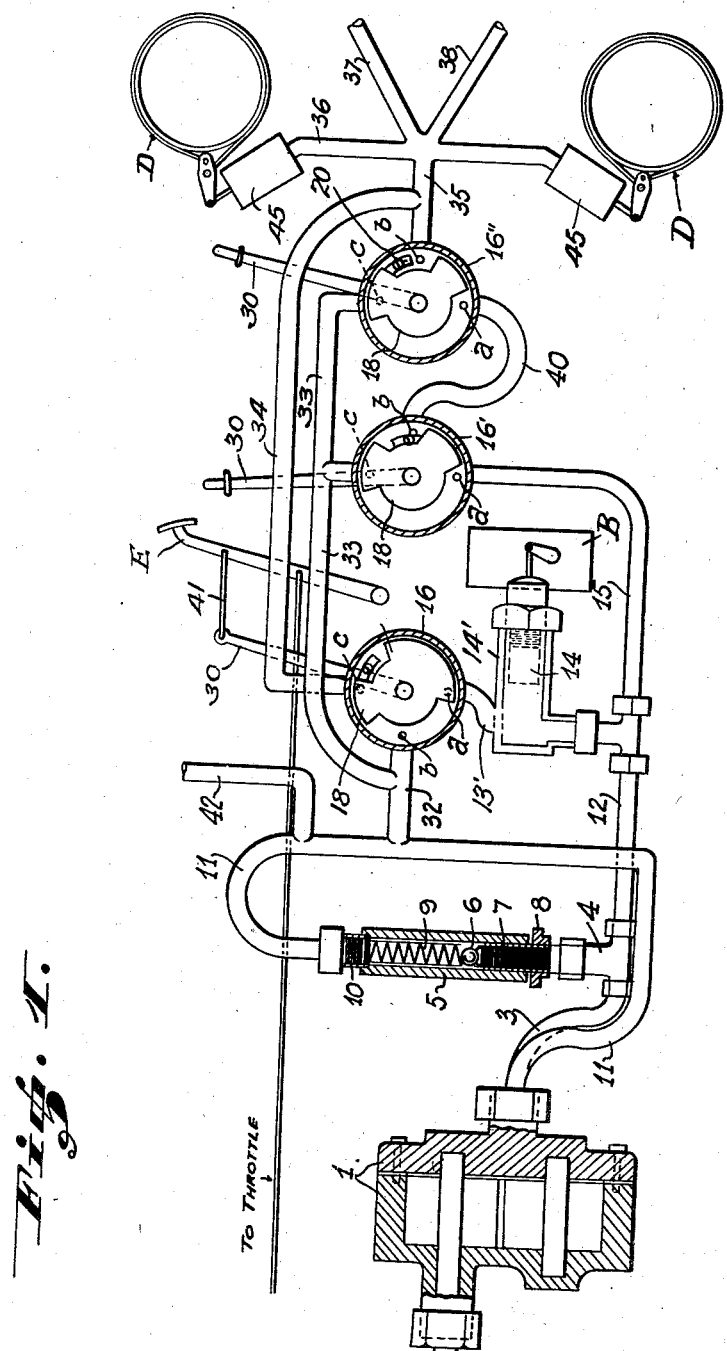
Figure 1 is a diagrammatic view illustrating the cooperative relationship of the elements of the present control mechanism when the engine is idle and the vehicle is at rest.

Referring to the drawings in detail, 1 designates, generally, a pump which may be of any suitable type and which may be driven in any suitable manner from any suitable part of a vehicle for the purpose of supplying pressure liquid for the operation of the control mechanism. In the present instance this pump 1 is illustrated as being of a rotatable type, and its driving shaft 2 may be assumed to be driven by the motor A of the vehicle whenever said motor is in operation.

As diagrammatically illustrated in Fig. 1 of the drawings, the vehicle (not shown) is inclusive of a clutch B, a brake or brakes D of a type which are constructed to be applied by the supply thereto of liquid under pressure, and an accelerator element E for controlling the speed of the motor A.

Connected with the clutch B is a piston 14 which operates in a cylinder 14' and which is arranged therein to be slid in a direction to disengage the clutch by liquid under pressure introduced into said cylinder.

At 16, 16' and 16", respectively, are illustrated three valves which are substantially duplicates of one another and which may be constructed as illustrated in Figs. 3, 4 and 5 of the drawings. That is to say, each of said valves, according to its embodiment illustrated in the present instance, comprises a body 19 which is recessed at one end and provided at said end with a closure cap 22 cooperating with the recess to provide a valve chamber 19'. Three suitably spaced ducts $a$, $b$ and $c$ formed in the body 19 open into the chamber 19' through the inner end wall thereof, and controlling the flow of liquid between said ducts through the valve chamber 19' is a pair of wings 18, 18 on the end of a shaft 17 which is rotatably mounted in an axial bore in the body 19.

The shaft 17 extends through the other end of the body 19 and is provided with an arm 30 for effecting its rotation, while in order to limit its rotative movement an adjustable stop member 20 which may be secured in adjusted position by a screw 21, is fastened within the chamber 19' to be engaged by one or the other of the wings 18.

Packing 28 and a cooperating packing unit 29 are provided to prevent escape of liquid from the chamber 19' around the shaft 17, while in order to hold the wings 18 against the inner wall of the chamber 19' to effectively close any given duct $a$, $b$ or $c$ when the same is blanked by one of the wings, a screw 24 is threaded in the cap 22 and has an anti-friction ball 25 interposed between its inner end and the adjacent end of the shaft 17. By tightening the screw 24 the wings 18 obviously may be seated with desired pressure and tightness against the inner wall of the chamber 19', while by means of a nut 26 which is threaded on the screw 24 and which is intended to be tightened against the cap 22, the said screw may be locked in a desired adjusted position.

Reverting to the diagrammatic illustration in Fig. 1 of the drawings, which shows the status of the mechanism when the engine is idle and the vehicle is at rest, it will be observed that the arm 30 of the valve 16 is connected as at 41 with the accelerator element E; and that the mechanism includes a pressure valve in the form of a cylinder 5 into one end of which is screwed a nipple 7 having a lock nut 8 threaded thereon for engagement with the cylinder, and further having, at its inner end, a seat against which a ball 6 normally is pressed by a spring 9 whereby liquid under less than a predetermined pressure is prevented from flowing through the nipple 7 into the cylinder.

The valves 16, 16' and 16'', the pump 1 and the pressure valve are suitably mounted on the vehicle, and, as illustrated in Fig. 1, the outlet of the pump is connected by a pipe 3 and fitting 4 first with the nipple 7 of the pressure valve, next by a pipe 12 and fitting 13 with the cylinder 14', and then by a pipe 15 with the duct a of the valve 16'. The cylinder 14' also is connected with the duct a of the valve 16 by a pipe 13', while the duct b of valve 16 is connected by a pipe 32 with a return pipe 11 which connects the outlet end of the cylinder 5 of the pressure valve with the inlet of the pump 1. Connecting the pipe 32 with the ducts c, c of the valves 16', 16'' is a pipe 33, while connecting the duct b of valve 16' with the duct a of the valve 16'' is a pipe 40. Leading from the duct b of the valve 16'' is a pipe 35 which, by means of branches 36, 37, 38 and 39, is connected with the respective cylinders 45 into which the introduction of liquid under pressure effects application of the brakes D, while connecting the pipe 35 with the duct c of the valve 16 is a pipe 34.

Normally, that is, when the vehicle is at rest and the motor is idle, the status of the mechanism is as illustrated in Fig. 1, which is to say that the ducts a and c of the valve 16 are blanked by the wings 18, 18 of said valve and the duct b of said valve is uncovered, the duct c of the valve 16' is blanked by one of the wings 18 of said valve and the other two ducts a and b of said valve are uncovered; one of the wings of the valve 16'' is in a position blanking the duct c of said valve and the other two ducts a and b thereof are uncovered, and the piston 14 is in an inner position within the cylinder 14' with the clutch engaged.

With the parts in the positions stated and upon starting of the motor and operation of the pump 1, liquid under pressure is forced through the pipe 3 to the fitting 4. At idling speed of the motor the pressure of the liquid is not sufficient to unseat the ball 6 of the pressure valve, but is sufficient to actuate the piston 14 to disengage the clutch 14 and to apply the brakes. Consequently since the liquid has access to the cylinder 14' but cannot flow therefrom, and since the liquid may flow through the pipe 15, the valve 16', the pipe 40, the valve 16'' and the pipe 35 and its branches to the brake cylinders and cannot return through the pipe 34 due to the duct c of the valve 16 being blanked, starting of the motor has the effect of moving the piston 14 to disengage the clutch B and of applying the brakes. In the event of the development of excess pressure of the liquid the valve 6 unseats and the pressure is relieved through the pipe 11.

With the engine running, the brakes applied and the clutch disengaged, and assuming that it is desired to start the vehicle, the next operation is to shift the usual transmission gear (not shown) to establish a desired status of said gear. If, now, the accelerator element E is actuated to increase the speed of the engine, the arm 30 of the valve 16 thereby is moved in a direction to rotate the wings 18 of said valve to uncover the ducts a and c. The valves 16' and 16'' are manually operable and are not manipulated, but remain as shown in Figure 1. In other words, the status of the mechanism now is as illustrated in Figure 6. Thus, the liquid is free to flow from the pump 1 through the pipes 3 and 12 and the fitting 13 to the cylinder 14', through said cylinder and the pipe 13' to the duct a of the valve 16, and from said valve through the duct b thereof and the pipe 11 back to the pump. Consequently, liquid pressure against the piston 14 is relieved and the clutch B is permitted to assume its normally engaged status establishing a driving connection between the engine A and the transmission gear. At the same time the brakes are released due to the relief of liquid pressure from the cylinders 45 by way of the pipes 35, 34, the open ducts c and b of the valve 16 and the pipe 11 and starting of the vehicle is effected.

If, now, the accelerator element E should be released the valve 16 would thereby be returned to its normal position shown in Figure 1 with disengagement of the clutch B and application of the brakes D. To avoid application of the brakes when the accelerator is released, the arm 30 of the valve 16' is manually swung to cause the wings 18 of said valve to close the duct a and to open the duct c thereof, the duct b remaining open. Thus, upon release of the accelerator element and return of the valve 16 to its Figure 1 status, following actuation of the valve 16' to close the duct a and to open the duct c, as illustrated in Figure 7, the liquid, because it cannot escape from the cylinder 14' through the pipe 13', acts on the piston 14 to disengage the clutch B. At the same time, since the liquid cannot flow from the pipe 15 through the now closed duct a of the valve 16', the brake applying cylinders 45 are not supplied with liquid under pressure, but are relieved of pressure through the pipe 35, the ducts b and a of the valve 16'', the pipe 40, the ducts b and c of the valve 16' and the pipes 33, 32 and 11. The vehicle thus is in motion due solely to inertia, unbraked and with the clutch disengaged, which incidentally permits changing of the transmission gear to any desired status.

If, with the vehicle in motion as just described, application of the brakes should be desired, it is sufficient, if the accelerator element E is not depressed, to return the valve 16' to the position shown in Figure 1, thereby to reestablish communication between the ducts a and b of said valve and to permit flow of liquid under pressure to the brake cylinders 45 as aforementioned, in which connection it is pointed out that the lever 30 of the valve 16', or a suitable connection to said lever, may be mounted on the steering wheel or the instrument board, or at any other convenient position for manual manipulation to actuate said valve 16'. On the other hand, if the vehicle is being driven at relatively high speed with the accelerator element E depressed and braking is desired, it is necessary first to release the accelerator element to return the valve 16 to its position shown in Figures 1 and 7, and then to actuate the valve 16' from its brake released position shown in Figure 7 to its brake applying position shown in Figures 1 and 6.

The valve 16'' is provided to be manually actuated in lieu of the valve 16' to serve the same purposes as the latter valve. However, the arm 30 of the valve 16'', or a suitable connection to said arm, preferably is mounted on or adjacent to the usual shift lever of the transmission gear so that, if desired, said valve 16″ may be actuated simultaneously with the gear shift lever.

The pressure valve affords means whereby the liquid under pressure may return to the pump through the pipe 11 in any case where the pressure of the liquid may be built up to exceed a predetermined operating pressure, while a pipe 42 connected to the pipe 11 affords means for supplying the mechanism with operating liquid.

The present mechanism provides for starting and stopping a motor vehicle with a minimum of effort and in a smooth, easy manner, and avoids the necessity of providing such conventional elements as foot levers for actuation of the brakes and the clutch.

While only a single specific embodiment of the invention has been illustrated and described, it is apparent that the same may be embodied in various other specifically different mechanical structures within its spirit and scope as defined in the appended claims.

I claim:—

1. In combination with the clutch, the motor accelerator element, and liquid pressure operated brake applying means of a motor vehicle, a motor driven pump for furnishing liquid under pressure, means connected with the pump and the clutch operable when the pump is in operation and when the accelerator element is in a position corresponding to idling speed of the engine to maintain the clutch disengaged, valve means operable by motor speed increasing movement of the accelerator element to cause engagement of the clutch, and other valve means manually operable to cause application and release of the brakes under the control of said first named means.

2. The combination as set forth in claim 1 including a pressure valve for by-passing the liquid back to the pump when the pressure of the liquid applied to the clutch disengaging means and the brake applying means exceeds a predetermined operating pressure.

3. In combination with the clutch, the motor accelerator element, and liquid pressure operated brake applying means of a motor vehicle, a source of supply of liquid under pressure, fluid pressure operated means connected to the clutch for disengaging the latter, a valve connected to the accelerator element and operable by motor speed increasing movement of said element to relieve the clutch disengaging means of liquid pressure, thereby to permit engagement of the clutch, said valve being movable with the accelerator element to a position to direct the liquid to act on said clutch disengaging means to cause disengagement of the clutch upon return of the accelerator lever to a position corresponding to idling speed of the engine, a second valve manually operable to permit and to deny flow of liquid to the brake applying means, and means whereby actuation of the first named valve to a position to relieve the clutch disengaging means of liquid pressure renders the brake applying means inoperative to apply the brakes regardless of the actuation of said second mentioned valve.

4. In combination with the clutch, the motor accelerator element, liquid pressure operated clutch disengaging means and liquid pressure operated brake applying means of a motor vehicle, a source of supply of liquid under pressure, a valve connected with the accelerator element and operable by motor speed increasing movement of said element to relieve the clutch disengaging means of liquid pressure, said valve upon return of the accelerator element to a position corresponding to idling speed of the motor being operable to control the flow of the liquid so that the clutch disengaging means is caused to disengage the clutch, and a second valve controlling the flow of liquid to the brake applying means, said second valve being operable independently of said first mentioned valve to cause application and release of the brakes when the first mentioned valve is in a position corresponding to an engine idling speed position of the accelerator element, and means whereby the brakes are maintained released when the first mentioned valve is in a position relieving the clutch disengaging means of fluid pressure.

5. The combination as set forth in claim 4 in which a third valve is connected in serial relationship to said second mentioned valve and is operable independently of said second mentioned valve to perform the same functions as the latter valve.

CESAR FLAMINI.